United States Patent [19]
Tsutsumi et al.

[11] Patent Number: 4,570,969
[45] Date of Patent: Feb. 18, 1986

[54] TORSION BAR SUSPENSION FOR AN AUTOMOTIVE VEHICLE

[75] Inventors: Takashi Tsutsumi, Fujisawa; Shuji Matsumoto, Atsugi, both of Japan

[73] Assignee: Nissan Motor Company, Limited, Yokohama, Japan

[21] Appl. No.: 567,904

[22] Filed: Jan. 3, 1984

[51] Int. Cl.[4] ............................................. B60G 11/20
[52] U.S. Cl. ..................................... 280/664; 280/695
[58] Field of Search ............... 280/664, 668, 695, 700; 267/57, 154

[56] References Cited

U.S. PATENT DOCUMENTS 2,998,241 8/1961 Eyb ..................................... 280/664
3,161,251 12/1964 Kraus ................................... 280/664
4,327,927 5/1982 Tanaka et al. ...................... 280/695
4,415,178 11/1983 Hatsushi et al. .................... 280/695

FOREIGN PATENT DOCUMENTS 2018358 10/1970 Fed. Rep. of Germany ...... 280/700

Primary Examiner—Joseph F. Peters, Jr.
Assistant Examiner—Ross Weaver
Attorney, Agent, or Firm—Leydig, Voit & Mayer

[57] ABSTRACT

A torsion bar suspension is provided with a torsion bar connected to a lower suspension arm and independent of the connection between the lower suspension arm and a vehicle body. The torsion arm is connected to the lower arm at a position remote from the position in which the lower arm is connected to the vehicle body. The torsion bar suspension also includes a compression rod connecting the lower suspension arm to the vehicle body, which compression arm is located outward of the torsion bar and is connected to the vehicle body at a point rearward of its connection to the lower arm. A bushing assembly is provided between the vehicle body and the lower arm allowing lateral and vertical movement of the lower arm relative to the vehicle body.

17 Claims, 6 Drawing Figures

TORSION BAR SUSPENSION FOR AN AUTOMOTIVE VEHICLE

BACKGROUND OF THE INVENTION

The present invention relates generally to a torsion bar-type automotive vehicle suspension. More specifically, the invention relates to a torsion bar suspension which is compact enough to provide adequate road clearance for the vehicle.

In conventional torsion bar-type suspension, a lower suspension arm supporting a vehicle wheel via a knuckle is pivotably suspended by means of a torsion bar. The torsion bar is fixed to the vehicle body at one end by means of a bracket with a bushing assembly. In this case, the bracket must be large enough to accommodate the bushing assembly and allow the torsion bar to pass through the axial opening of the bushing assembly. Such brackets may provide only marginally sufficient road clearance for the vehicle. In other words, the bracket may be so big as to strike the road surface while the vehicle is travelling over rough roads.

In addition, since the bifurcated inner ends of the lower arm are connected to the torsion bar in axial alignment with respect to the latter, when forces are applied to the knuckle along the longitudinal axis of the torsion bar, such as during acceleration, deceleration and so forth, relatively large lateral forces are applied at the junction between the rear leg of the bifurcated lower arm and the torsion bar. Due to these lateral forces, the the bushing in the bushing assembly deforms laterally, resulting in compliance steering by which the toe angle of the wheel will change in the toe-out direction. As will be appreciated, due to this toe-out change, the cornering force will be reduced, thereby degrading driving stability.

SUMMARY OF THE INVENTION

Therefore, it is an object of the present invention to provide a torsion bar-type vehicle suspension which has a suspension arm connected to the vehicle body by means of a bracket of reduced size.

Another and more specific object of the present invention is to provide a torsion bar suspension which has a suspension arm with front and rear legs extending therefrom, which legs are connected to the vehicle body at a position offset laterally from the vehicle longitudinal axis.

According to the present invention, a torsion bar suspension is provided with a torsion bar connected to a lower suspension arm and independent of the connection between the lower suspension arm and the vehicle body. The torsion arm is connected to the lower arm at a position remote from the position in which the lower arm is connected to the vehicle body. The torsion bar suspension also incorporates a compression rod for connecting the lower suspension arm to the vehicle body, which compression rod is located outboard of the torsion bar and connected to the vehicle body at a point rearward of its connection to the lower arm. A bushing assembly is provided between the vehicle body and the lower arm, allowing lateral and vertical movement of the lower arm relative to the vehicle body.

In a preferred structure, the pivotal axis of the lower arm is inclined forward, i.e., its forward end is lower than the rearward end and the torsion bar extends parallel to this pivotal axis.

A torsion bar suspension for an automotive vehicle, according to one aspect of the present invention, comprises a suspension arm rotatably supporting a vehicle wheel at the outer end thereof and having first front leg portion and second rear leg portion, first bracket secured to the vehicle body and pivotably securing the first leg of the suspension arm onto the vehicle body, a torsion bar connected to the first leg of the suspension arm and extending essentially along the longitudinal vehicle axis at one end thereof, the other end thereof being secured to the vehicle body, second bracket secured to the vehicle body and pivotably connecting the rear leg of the suspension arm onto the vehicle body, the second bracket being located outer-side of the torsion bar, and a compression rod interpositioned between the second leg of the suspension arm and the second bracket so that is may be connected to the second bracket at rear side of the rear end of the second leg.

According to another aspect, a torsion bar suspension for an automotive vehicle comprises an upper suspension arm, a lower suspension arm having an outer end cooperative with the outer end of the upper suspension arm for rotatably suspensing a vehicle wheel and having first and second inner ends connected to a vehicle body, a first pivot means for connecting the first inner end of the lower arm so that the lower arm is pivotable above a pivot axis extending essentially along the vehicle longitudinal axis, a torsion bar connected to the first inner end of the lower arm at a portion remote from the first pivot means, the torsion bar extending to align the axis thereof with the pivot axis of the first pivot means, a rod member connecting the second inner end of the lower arm to the vehicle body, the rod member having an axis extending across the axis of the torsion bar, the rod member connected to the vehicle body at a position laterally offset from the torsion bar and at rearward of the rear end of the second inner end of the lower arm.

BRIEF DESCRIPTION OF THE DRAWINGS

The present invention will be understood more fully from the detailed description given herebelow and from the accompanying drawings of the preferred embodiment of the present invention, which, however, should not be taken to limit the invention but are for explanation and understanding only.

In the drawings.

DESCRIPTION OF THE PREFERRED EMBODIMENTS

Figure 1:
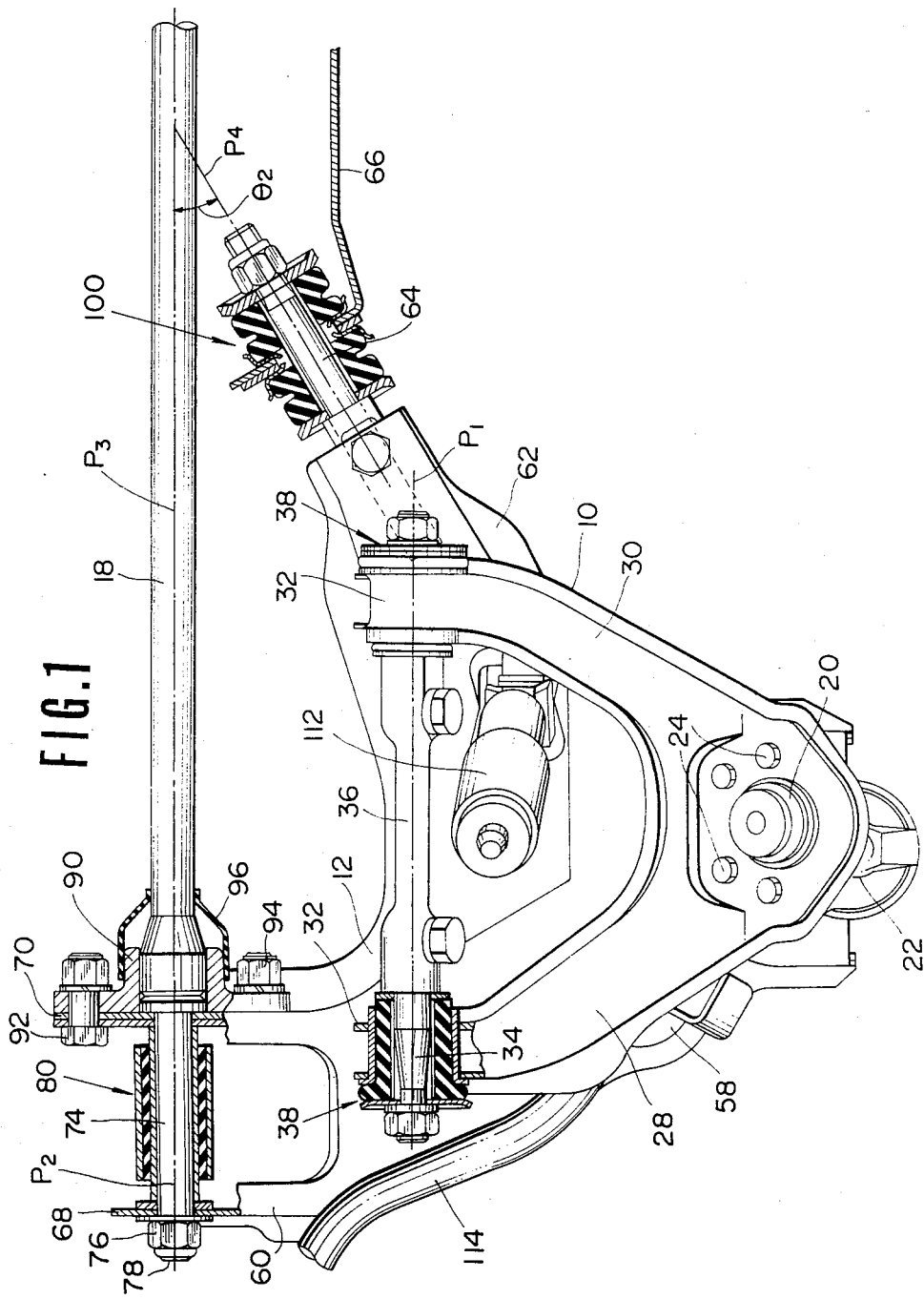
FIG. 1 is a plan view of the preferred embodiment of a torsion bar suspension according to the present invention.
Figure 2:
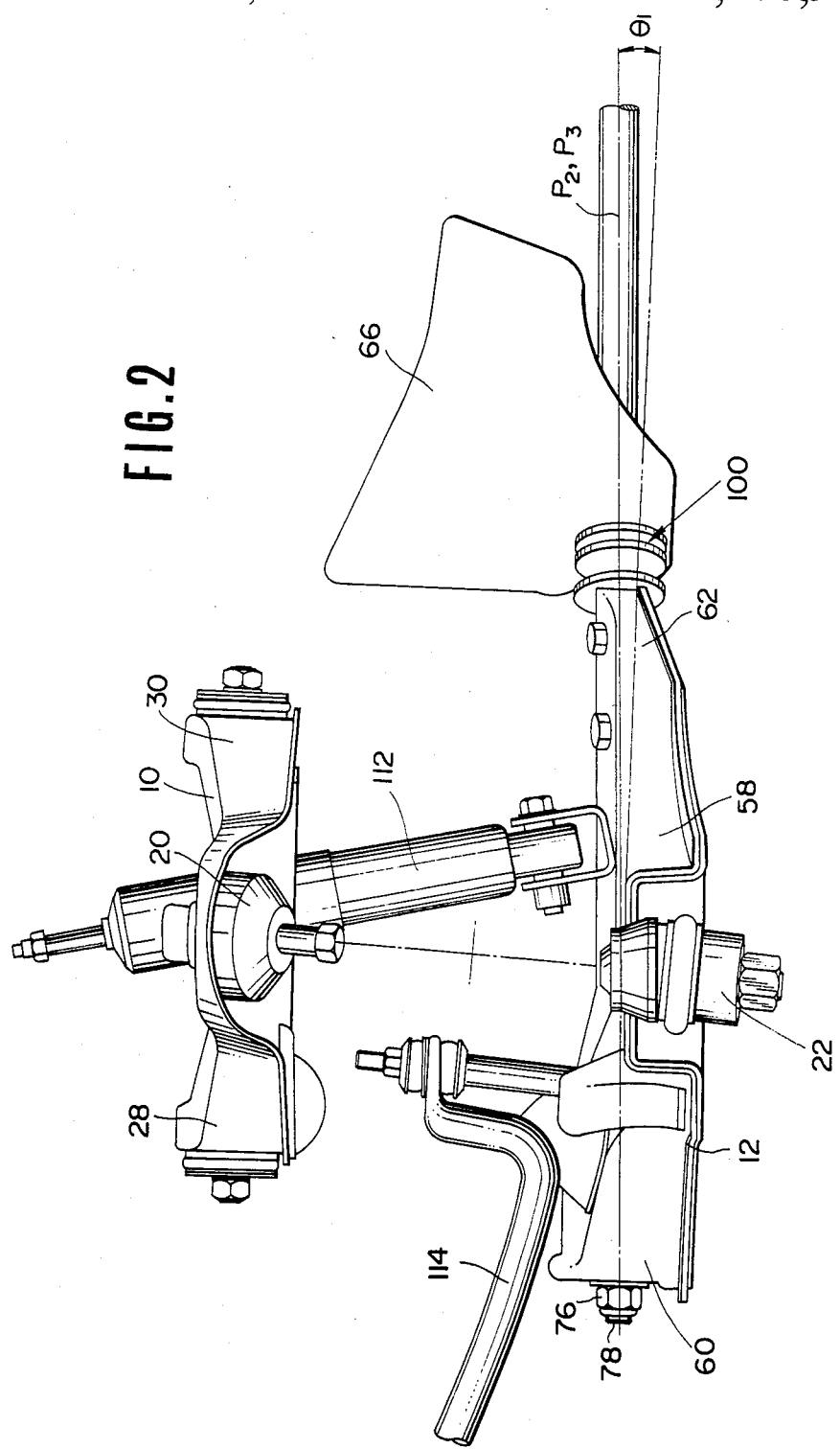
FIG. 2 is a side elevation of part of the torsion bar suspension of FIG. 1.

Referring now to the drawings, particularly to FIGS. 1 and 2, a torsion bar-type vehicle suspension generally comprises upper and lower arms 10 and 12 respectively extending essentially perpendicularly to the longitudinal axis of the vehicle. The outer ends of the upper and lower arms 10 and 12 support a vehicle wheel via a knuckle (not shown). The inner ends of the upper and lower arms 10 and 12 are both pivotably connected to the vehicle body. The lower arm 12 is associated with a torsion bar 18 which provides a resilient damping force for absorbing relative displacements between the vehicle body and the vehicle wheel.

Upper and lower ball joints 20 and 22 are rigidly secured to the outer ends of the upper and lower arms 10 and 12 by mean of fastener bolts 24. The upper and lower ball joints 20 and 22 serve to pivotably support the knuckle 14 which has a spindle (not shown) for rotatably supporting the wheel hub, and/or a brake assembly in per se known manner.

The upper arm 10 has a generally U-shaped configuration defined by bifurcated legs 28 and 30 respectively extending inwardly. Each of the legs 28 and 30 has an inner end 32, each of which is rotatably engaged to one end 34 of a connecting rod 36 via bushing assemblies 38, which connecting rod is rigidly secured to the vehicle body.

Figure 3:
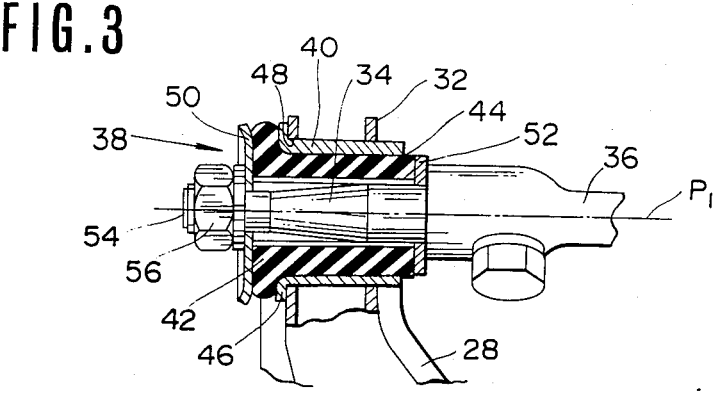
FIG. 3 is an enlarged view in partial section of the area labelled A in FIG. 1.

As shown in FIG. 3, the bushing assembly 38 comprises an outer collar 40, an elastic bushing 42 which is made of rubber, for example, and an inner collar 44. The outer collar 40 has a radially extending flange 46 at one end and is adapted to be rigidly secured within an opening 48 in the inner end 32 of leg 28 or 30. The inner collar 44 has radial flanges 50 and 52 at both ends. The flanges 50 and 52 serve to retain the elastic bushing 42 over the inner collar. The hollow tubular inner collar 44 accommodates the end of the connecting rod 36. The connecting rod 36 has smaller diameter sections 34 at both ends to which the inner ends 32 of the legs 28 and 30 of the upper arm 10 are connected. The smaller diameter sections 34 are threaded to engage fastener nuts 56 so as to fix the inner ends 32 to the connecting rod 36.

With this construction, the upper arm 10 is pivotable about the axis $P_1$ of the connecting rod 36.

As shown in FIGS. 1 and 2, the lower arm 12 has a body 58 and front and rear extensions 60 and 62. The rear extension 62 is connected to a compression rod 64 which is, in turn, connected to a connecting bracket 66 of the vehicle body. On the other hand, the front extension 60 has bifurcated end sections 68 and 70 with through openings 72. A connecting rod 74 extends through the opening 72 of the bifurcated end sections 68 and 70 is fixed thereto by means of a fastener nut 76 engaging a threaded portion 78 of the connecting rod 74. The portion of the connecting rod 74 between the end sections 68 and 70 passes through a bushing assembly 80 rigidly fixed to the vehicle body.

As apparent from FIG. 2, a longitudinal axis $P_2$ of the connecting rod 74 is inclined forward at an angle $\theta_1$ with respect to the vehicle horizontal plane. This tilt angle $\theta_1$ is intended to suppress pitching movement of the vehicle body, and especially to suppress diving of the vehicle body during deceleration and so forth. Hereafter, the foregoing angle $\theta_1$ of the connecting rod 74 will be referred to as the "anti-dive angle".

Figure 4:
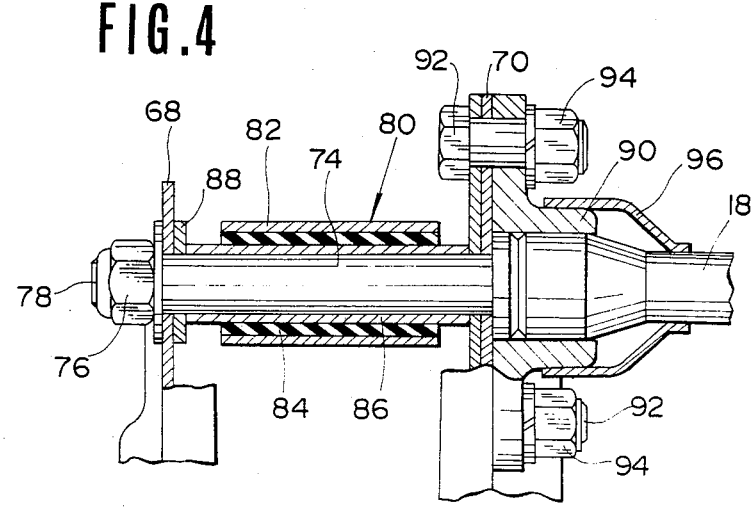
FIG. 4 is an enlarged view in partial section of the area labelled B in FIG. 1.

As shown in FIG. 4, the bushing assembly 80 comprises an outer collar 82 which is rigidly secured to the vehicle body, although it is not shown in the drawings by what means it is fixed to the vehicle body, an elastic bushing such as a rubber bushing 84 and an inner collar 86. As apparent from FIG. 4, the inner collar 86 extends beyond the ends of the elastic bushing 84 to cover almost the entire length of the connecting rod 74 and has a flange 88 at one end thereof, which flange 88 contacts the end section 68.

The front end of the torsion bar 18 is attached to the inner end section 70 of the extension 60 by means of a fixing bracket 90 secured to the front end of the torsion bar 18 and rigidly fixed to the end section 70 by means of fastener bolts 92 and nuts 94. A dust cover 96 fits over the junction of the torsion bar 18 and the end section 70. The longitudinal axis $P_3$ of the torsion bar 18 is approximately aligned with the axis $P_2$ of the connecting rod 74 and so matches the anti-dive angle. It should be appreciated that the rear end of the torsion bar 18 is fixed to the vehicle body in a per se well-known manner, although it is not shown in the drawings.

Figure 5:
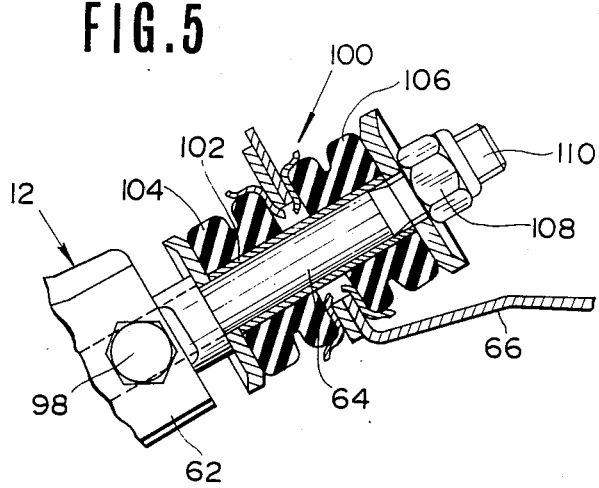
FIG. 5 is an enlarged view in partial section of the area labelled C encircled in FIG. 1.

As shown in FIG. 5, the front end of the compression rod 64 is connected to the rear extension of the lower arm 12 by means of a fastener bolt 98. The rear end of the compression rod 64 is equipped with a bushing assembly 100 by which the compression rod is connected to the vehicle body bracket 66. The bushing assembly 100 has an inner collar 102 extending coaxially with the compression rod, and a pair of elastic bushings 104 and 106 located on opposite sides of the bracket 66. The bushing assembly 100 is secured to the compression rod 64 by means of a fastener nut 108 engaging a threaded portion 110 of the compression rod.

In the foregoing structure, the lower arm 12 can be displaced about the compression rod 64 while deforming the bushings 102 and 104. On the other hand, the lower arm 12 is rotatable about an imaginary pivot axis which lies in approximate alignment with the axis $P_2$ of the connecting rod 74.

Additionally, the shown torsion bar vehicle suspension is provided with a shock absorber 112 responsive to vertical forces to allow relative vertical displacement between the vehicle body and the vehicle wheel while producing a damping force thereagainst. Also, a stabilizer 114 is provided to increase the reaction force to lateral forces in order to increase cornering force and so forth for the sake of driving stability.

From the geometrical point of view of the preferred structure of the torsion bar suspension as illustrated, the axis $P_4$ of the compression rod 64 is inclined forward at a given angle $\theta_2$ with respect to the the axis $P_3$ of the torsion bar 18 on the plane extending through the pivot axis of the lower arm 12. That is, the above plane is inclined relative to vehicle horizontal plane at the angle approximately corresponding to the tilt angle $\theta_1$ of the connecting rod 74. The torsion bar 18 is closer to the longitudinal axis of the vehicle than the junction between the compression rod 64 and the vehicle body bracket 66, i.e., it lies inward of the latter. In addition, as apparent from FIG. 2, the junction between the compression rod 64 and the vehicle body bracket lies at approximately the same elevation as the corresponding portion of the torsion bar 18. In other words, the junction, the axis $P_4$ of the compression rod 64 and the torsion bar 18 all lie in the same plane inclined at the angle $\theta_1$ relative to the vehicle horizontal plane.

From the structural view point, the torsion bar 18 is connected to the end section 70 of the front extension 60 of the lower arm and is separated from the junction between the lower arm and the vehicle body and so is indirectly connected to the vehicle body. Furthermore, the rear extension of the lower arm 12 is connected to the vehicle body via the compression rod 64, the junction of which with the vehicle body is separated from the torsion bar 18 laterally. This structure effectively prevents impact of the mentioned junctions on the road surface during compliance steering or while travelling on rough roads.

While the vehicle is running, road shock and other vibrations are applied to the vehicle wheel. Due to the vibrations applied through the wheel, the upper and lower arms 10 and 12 pivot about their respective pivot axes $P_1$ and $P_2$. Due to this pivotal movement of the lower arm 12, the fixing bracket 90 secured thereto thus rotates about the pivot axis $P_2$, thus twisting the torsion bar 18. The torsion bar 18 produces a counteracting torsional force against the rotational force applied to the lower arm 12. This torsional force created by the torsion bar 18 serves as a damping force against vehicle wheel vibrations so as to stabilize the wheel. Furthermore, due to the torsional force of the torsion bar 18, the vehicle wheel is constantly biased towards the road surface so that road-and-tire traction remains approximately constant.

Figure 6:
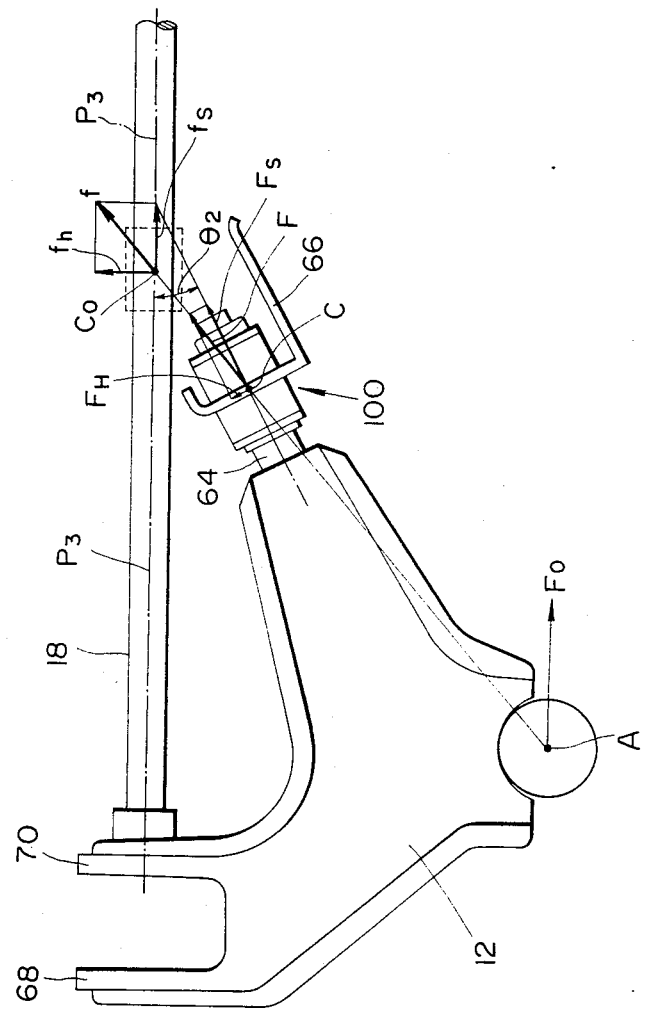
FIG. 6 is an explanatory diagram of the forces applied to parts of the torsion bar suspension of FIG. 1 during acceleration of the vehicle.

On the other hand, when a torque is applied to the wheel axle during acceleration, deceleration and so forth, a backward force Fo is applied to the knuckle at the point A. Due to this backward force Fo, compliance steering occurs, deforming the various bushings. Due to the backward force Fo, a force represented by the arrow f in FIG. 6 is applied to a point Co defined by the intersection of a line defined by the point A of the knuckle and a point C on the vehicle body bracket 66 and the axis $P_4$ of the torsion bar 18.

The force f at the point Co has an axial component $f_s$ of the force directed axially along the torsion bar 18, and a lateral component $f_h$ of the force directed perpendicular to the axis of the torsion bar 18. At the same time, a force F is applied to the point C on the vehicle body bracket 66 parallel to the line including the points A and Co. The force F has an axial component $F_S$ parallel to the axis $P_4$ of the compression rod 64 and a lateral component force $F_H$ perpendicular to the axis $P_4$.

Due to the lateral component $f_h$ of the force f and the lateral component $F_H$ of the force F, the bushings 84 of the bushing assembly 80 and the bushings 104 and 106 of the bushing assembly 100 are deformed to allow horizontal pivotal displacement of the lower arm 12. This horizontal pivotal displacement of the lower arm 12 causes displacement of the wheel axis resulting in a change in toeing angle. According to the shown embodiment, the lateral component $F_H$, which causes deformation of the bushings 104 and 106, is quite limited so that pivotal movement of the lower arm 12 is minimized in order to reduce the magnitude of toe-angle change in the toe-out direction during compliance steering.

As a result, the suspension of the shown embodiment provides improved driving stability for the vehicle.

In addition, as set forth above, the connection of the lower arm of the suspension according to the present invention provides adequate road clearance for the vehicle so that impact between the suspension and the road surface is satisfactorily and successfully prevented. Furthermore, because the various connection between the vehicle body and the lower arm are remote from one another, the connections do not interfere with one another.

What is claimed is:

1. A torsion bar suspension for an automotive vehicle comprising:

a suspension arm rotatably supporting a vehicle wheel at the outer end thereof and having a first front leg portion and a second rear leg portion;

a first bracket secured to the vehicle body and pivotably securing said first leg of said suspension arm to the vehicle body;

a torsion bar mounted on the vehicle body via said first bracket, connected at one end to said first leg of said suspension arm and extending essentially along the longitudinal vehicle axis, the other end thereof being secured to the vehicle body;

a second bracket secured to the vehicle body independently of said torsion bar and pivotably connecting said rear leg of said suspension arm onto said vehicle body, said second bracket being located at a position transversely and axially away from the position of said first bracket; and a compression rod interposed between said second leg of said suspension arm and said second bracket so as to be connected to said second bracket rearward of the rear end of said second leg.

2. The suspension as set forth in claim 1, wherein said first leg of said suspension arm is connected to said first bracket via an axle, the axis of which lies parallel to the torsion bar and serves as a pivot axis for suspension arm movement.

3. The suspension as set forth in claim 2, wherein said axes of the axle and said torsion bar are inclined forward in order to perform an anti-dive function.

4. The suspension as set forth in claim 3, wherein said compression rod is coplanar with the torsion bar axis.

5. The suspension as set forth in claim 4, wherein a first bushing assembly is interposed between said first leg and said first bracket, said first bushing assembly allowing limitted movement of said suspension arm perpendicular to said axis of the axle.

6. The suspension as set forth in claim 5, wherein a second bushing assembly is provided between said compression rod and said second bracket for allowing limitted displacement of the suspension arm parallel to the axis of said compression rod.

7. The suspension as set forth in claim 6, wherein the rearward end of said compression rod is closer to the vehicle longitudinal axis than its forward end.

8. A torsion bar suspension for an automotive vehicle comprising:

an upper suspension arm having an outer end;

a lower suspension arm having an outer end cooperative with the outer end of said upper suspension arm for rotatably supporting a vehicle wheel and having first and second inner ends connected to a vehicle body;

first pivot means for supporting said first inner end of said lower arm so that said lower arm is pivotable about a pivot axis essentially parallel to the vehicle longitudinal axis, said first pivot means including a first bracket for pivotably mounting said first inner end;

a torsion bar connected to said first inner end of said lower arm through said first bracket and mounted to the vehicle body by means of said first bracket at a point remote from the point at which said first inner end of said suspension arm is pivoted, said torsion bar extending parallel to said pivot axis of said first pivot means; and second pivot means for supporting said second inner end of said lower arm and secured to said vehicle body independently of said torsion bar, said second pivot means including a rod member connecting said second inner end of said lower arm to said vehicle body, the axis of said rod member lying oblique to said axis of said torsion bar, said rod member being connected to said vehicle body at a point offset axially along and laterally from said torsion bar and located rearward of the rear end of said second inner end of said lower arm.

9. The suspension as set forth in claim 8, wherein said pivot axis and the axis of said torsion bar are inclined forward.

10. The suspension as set forth in claim 9, wherein said rod member is coplanar with said torsion bar axis.

11. The suspension as set forth in claim 10, wherein said first inner end of said lower arm has bifurcated leg portions between which a pivot axle defining said pivot axis extends, and said pivot axle rotatable engages a first bushing assembly with an elastically deformable bushing, which first bushing assembly connects said first inner end to said vehicle body.

12. The suspension as set forth in claim 11, wherein said torsion bar is connected to one of said leg portions by means of a boss extending from the latter.

13. The suspension as set forth in claim 12, wherein said rod member is rigidly secured to said second inner end and connected to said vehicle body via a second bushing assembly with an elastically deformable bushing allowing axial displacement of said lower arm along the connecting between said rod member and said vehicle body.

14. A torsion bar suspension for an automotive vehicle comprising:
a suspension arm rotatably supporting a vehicle wheel at the outer end thereof and having a front leg portion and a rear leg portion, said front leg portion including front and rear end sections;
a connecting rod fixedly mounted between said front and rear end sections;
first bracket means mounted about the connecting rod and secured to a first portion of the vehicle body for pivotably securing said front leg portion of said suspension arm to the vehicle body;
a torsion bar including a front end means mounted to said rear end section of said front leg portion of said suspension arm and rear end means connected to a second portion of the vehicle body, the axis of said torsion bar being aligned with the axis of said connecting rod;
a compression rod mounted to said rear leg portion and extending rearward obliquely toward said torsion bar, the axis of said compression rod and the aligned axes of said connecting rod and said torsion bar defining a plane which is inclined forward with respect to the vehicle horizontal plane; and
second bracket means secured to a third portion of the vehicle body different from the second portion of the vehicle body for pivotably connecting said compression rod to said vehicle body, the junction between said second bracket means and said compression rod being farther from the vehicle longitudinal axis than said torsion bar and being rearward of the junction between said first bracket means and said connecting rod.

15. A torsion bar suspension for an automotive vehicle comprising:
an upper suspension arm;
a lower suspension arm having an outer end cooperative with the outer end of said upper suspension arm for rotatably supporting a vehicle wheel and having first and second inner ends connected to a vehicle body;
first pivot means for supporting said first inner end of said lower arm so that said lower arm is pivotable about a pivot axis essentially parallel to the vehicle longitudinal axis, said first pivot means including a first bracket for pivotably mounting said first inner end and said first inner end of said lower arm having bifurcated leg portions between which a pivot axle defining said pivot axis extends, said pivot axle rotatably engaging a first bushing assembly with an elastically deformable bushing, which first bushing assembly connects said first inner end to said vehicle body;
a torsion bar connected to said first inner end of said lower arm through said first bracket and mounted to the vehicle body by means of said first bracket at a point remote from the point at which said first inner end of said suspension arm is pivoted, said torsion bar extending parallel to said pivot axis of said first pivot means and said pivot axis and the axis of said torsion bar being inclined forward; and
a rod member connecting said second inner end of said lower arm to said vehicle body, the axis of said rod member lying oblique to said axis of said torsion bar and said rod member being coplanar with said torsion bar axis, said rod member being connected to said vehicle body at a point offset axially along and laterally from said torsion bar and located rearward of the rear end of said second inner end of said lower arm.

16. The suspension as set forth in claim 15 wherein said torsion bar is connected to one of said leg portions by means of a boss extending from the latter.

17. The suspension as set forth in claim 16 wherein said rod member is rigidly secured to said second inner end and connected to said vehicle body via a second bushing assembly with an elastically deformable bushing allowing axial displacement of said lower arm along the connection between said rod member and said vehicle body.

* * * * *

UNITED STATES PATENT AND TRADEMARK OFFICE
CERTIFICATE OF CORRECTION

PATENT NO. : 4,570,969

DATED : February 18, 1986

INVENTOR(S) : Takashi Tsutsumi and Shuji Matsumoto

It is certified that error appears in the above-identified patent and that said Letters Patent is hereby corrected as shown below:

On first page of patent, after "[22] Filed: Jan. 3, 1984"

insert --[30] Foreign Application Priority Data

Feb. 4, 1983 [JP]   Japan     58-17247--

Signed and Sealed this

Thirteenth Day of October, 1987

Attest:

DONALD J. QUIGG

*Attesting Officer*        *Commissioner of Patents and Trademarks*